(12) United States Patent
Honda et al.

(10) Patent No.: US 7,424,146 B2
(45) Date of Patent: Sep. 9, 2008

(54) DEFECT INSPECTION METHOD

(75) Inventors: Toshifumi Honda, Yokohama (JP); Hirohito Okuda, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 686 days.

(21) Appl. No.: 10/640,343

(22) Filed: Aug. 12, 2003

(65) Prior Publication Data

US 2004/0032979 A1 Feb. 19, 2004

(30) Foreign Application Priority Data

Aug. 12, 2002 (JP) ............... 2002-234301

(51) Int. Cl.
*G06K 9/00* (2006.01)
*H04N 7/18* (2006.01)
*G01N 21/00* (2006.01)

(52) U.S. Cl. .............. 382/149; 382/218; 356/237.1; 348/125

(58) Field of Classification Search ......... 382/141–152, 382/217–228; 348/125–134, 86–95; 250/306–311, 250/223; 700/95–212; 29/833; 438/16; 356/237.1–237.6, 426–431; 702/35–40
See application file for complete search history.

(56) References Cited

U.S. PATENT DOCUMENTS

| | | | | |
|---|---|---|---|---|
| 5,991,699 | A * | 11/1999 | Kulkarni et al. | 702/83 |
| 6,047,083 | A * | 4/2000 | Mizuno | 382/141 |
| 6,284,553 | B1 * | 9/2001 | Steffan et al. | 438/14 |
| 6,456,899 | B1 * | 9/2002 | Gleason et al. | 700/212 |
| 6,898,305 | B2 * | 5/2005 | Hiroi et al. | 382/149 |
| 6,987,873 | B1 * | 1/2006 | Ben-Porath et al. | 382/145 |
| 2001/0033683 | A1 * | 10/2001 | Tanaka et al. | 382/149 |
| 2002/0014506 | A1 * | 2/2002 | Teich | 224/441 |
| 2002/0051565 | A1 * | 5/2002 | Hiroi et al. | 382/149 |
| 2003/0015659 | A1 * | 1/2003 | Honda et al. | 250/306 |

(Continued)

FOREIGN PATENT DOCUMENTS

JP 2000-105203 4/2000

(Continued)

*Primary Examiner*—Aaron W Carter
(74) *Attorney, Agent, or Firm*—Townsend and Townsend and Crew LLP

(57) ABSTRACT

The present invention relates to a defect detection or observation method that detects fine defects in the course of defect inspection and observation, does not detect locations not constituting defects, or classifies a defect candidate as a grain phenomenon or other phenomenon that does not affect a product. In one embodiment, a method for inspecting defects of a product having a plurality of product units formed repetitively at different locations comprises obtaining an image of the product units on the product having an appearance to be observed; detecting regions of the image each having an appearance which differs from an expected appearance by greater than a preset threshold; calculating feature amounts for the detected regions; classifying the detected regions into groups of defect candidates; forming an aggregate of the feature amounts of the detected regions in the different product units, for each of the groups of defect candidates; and determining for each product unit attributes for the detected regions by comparing the feature amounts of the detected regions belonging to each group of defect candidates with a distribution of the aggregate of the feature amounts for the group of defect candidates.

20 Claims, 6 Drawing Sheets

U.S. PATENT DOCUMENTS

2003/0076989 A1* 4/2003 Maayah et al. .............. 382/145
2003/0203520 A1* 10/2003 Worster et al. ................ 438/14
2003/0228045 A1* 12/2003 Asai et al. .................. 382/141
2007/0104357 A1* 5/2007 Worster et al. .............. 382/149
2007/0131877 A9* 6/2007 Hiroi et al. ............... 250/492.2
2008/0002876 A1* 1/2008 Hiroi et al. ................. 382/144

FOREIGN PATENT DOCUMENTS

JP        2001-077165         3/2001

* cited by examiner

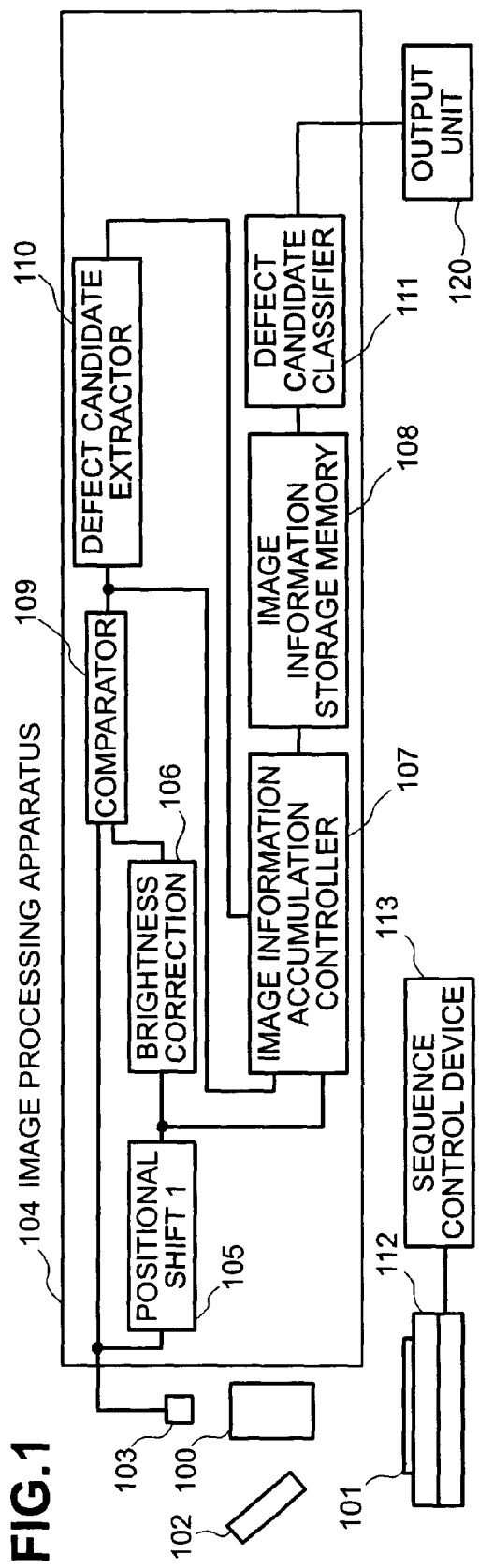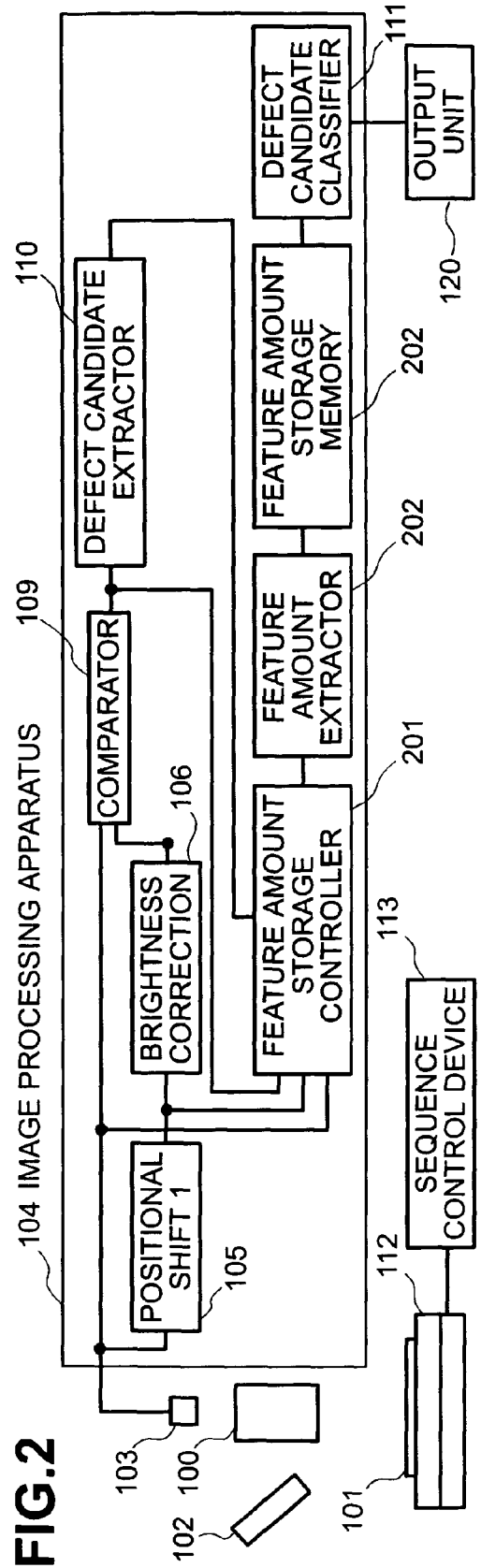

301 INSPECTION IMAGE
303 DEFECT
304
305

302 COMPARISON IMAGE

306 DIFFERENTIAL IMAGE 310  308
311  309
307 ACCUMULATED DIFFERENTIAL IMAGE

401 DISPERSION MAP

403 GAUSSIAN DISTRIBUTION APPROXIMATION
404 LARGE BRIGHTNESS DIFFERENTIAL PART BRIGHTNESS DIFFERENTIAL
402 BRIGHTNESS DIFFERENTIAL FREQUENCY DISTRIBUTION CORRESPONDING TO 309

FIG.5 (a)

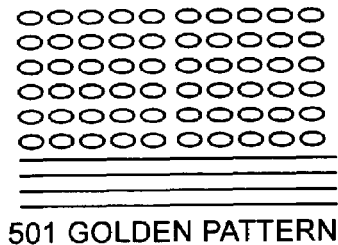

501 GOLDEN PATTERN

FIG.5 (b)

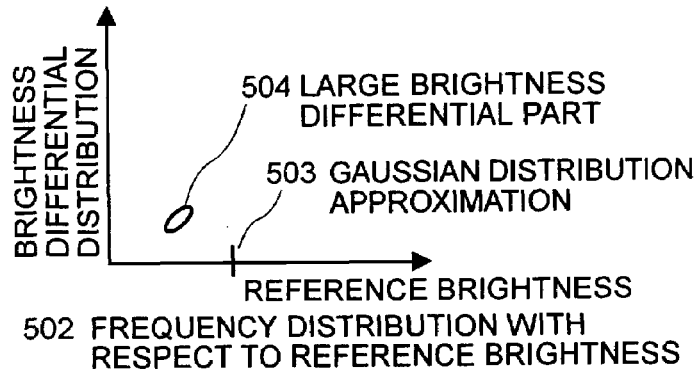

504 LARGE BRIGHTNESS DIFFERENTIAL PART
503 GAUSSIAN DISTRIBUTION APPROXIMATION
502 FREQUENCY DISTRIBUTION WITH RESPECT TO REFERENCE BRIGHTNESS

FIG.5 (c)

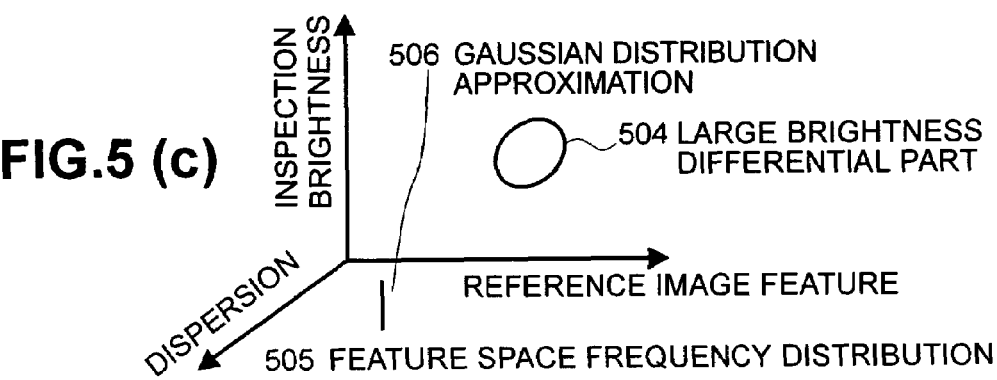

506 GAUSSIAN DISTRIBUTION APPROXIMATION
504 LARGE BRIGHTNESS DIFFERENTIAL PART
505 FEATURE SPACE FREQUENCY DISTRIBUTION

FIG.6

| EXTRACTION OF DEFECT CANDIDATES AND LARGE DIFFERENTIAL IMAGE REGIONS. | |
|---|---|
| | SETTING OF GROUPING REGIONS PRODUCED BY GROUPING NEIGHBORING REGIONS ACCORDING TO DEFECT CANDIDATES AND LARGE DIFFERENTIAL IMAGE REGIONS. |
| FOR EACH DEFECT CANDIDATE | CALCULATION OF FEATURE AMOUNTS ON THE BASIS OF DIFFERENTIAL IMAGE BRIGHTNESS CORRECTED ACCORDING TO THE DISTRIBUTION OF THE DIFFERENTIAL IMAGE BRIGHTNESS OF THE GROUPING REGIONS TO WHICH THE DEFECT CANDIDATES BELONG. |
| | USING CALCULATED FEATURE AMOUNTS TO DETERMINE WHETHER THE DEFECT CANDIDATES ARE ACTUAL DEFECTS. |

DEFECT INSPECTION METHOD

CROSS-REFERENCES TO RELATED APPLICATIONS

This application relates to and claims priority from Japanese Patent Application No. 2002-234301, filed on Aug. 12, 2002, the entire disclosure of which is incorporated herein by reference.

BACKGROUND OF THE INVENTION

1. Field of the Invention

The present invention relates to a defect inspection method for manufactured products, and more particularly to a method for detecting defects in semiconductor products such as LSIs, TFTs, PDPs and thin-film display elements that require highly accurate defect detection, and relates to a method for evaluating these detected defects.

2. Description of the Related Art

As semiconductor design rules have become more detailed, the size of the manufacturing defects of semiconductor products has also become extremely small. The practice of detecting and reviewing defects by means of images detected using a conventional visible light source has grown difficult, and hence inspections and reviews of defects have come to be performed by using images detected by means of inspection devices employing DUV light as the light source, as well as images detected using SEM.

However, the increase in sensitivity afforded by using a DUV light source and SEM has frequently produced problems such as the detection of minute inconsistencies in the pattern not originally requiring detection, the detection of parts exhibiting thin film interference which is generated through the use of DUV light, the detection of locations which are targeted for charging by electrons that are emitted when an SEM image is picked up and so forth, or the detection of locations that were not originally defects.

As an example of a corresponding conventional technology, a method for determining, on the basis of localized correlations between a defect image and a reference image from inconsistencies in localized gray scale values generated between the defect image and the reference image, whether or not the resulting image constitutes a defect, is described in Japanese Patent Application Laid-Open No. 2001-77165, for example.

Furthermore, Japanese Patent Application Laid-Open No. 2000-105203 discloses a technology that involves calculating scattering on the basis of the locations in which identical patterns were originally formed or of signals that are obtained through detection of regions in the vicinity of these locations, and then detecting defects from a signal detected on the basis of a determination reference which is established on the basis of the scattering thus calculated.

However, the above conventional technology has failed to adapt to the increased detail of the defects detected or to the increase in pattern detail.

For example, according to the technology disclosed by Japanese Patent Application Laid-Open No. 2001-77165, a correlation between the defect image and the reference image is found for each region in which the gray scale unevenness is different and then defects are detected on the basis of the correlations thus found. However, feature amounts such as texture and gray scale values, and so forth, are used as the means for performing segmentation into regions in which the gray scale unevenness is different. Consequently, reliable segmentation into regions in which the gray scale unevenness is different is problematic, no consideration having been paid to the problem that sections with varying degrees of gray scale unevenness belong within the same region, which is a possibility that results from such segmentation.

On the other hand, according to the method disclosed by Japanese Patent Application Laid-Open No. 2000-105203, although scattering is calculated on the basis of signals that are obtained by means of detection from regions in the vicinity of locations in which identical patterns were originally formed, this method does not take into consideration the elimination of grain effects which are most evident in the wiring step and so forth. Grains are a phenomenon that is clearly visible in the wiring step and constitute a phenomenon according to which there is a variation in the detected brightness of the wiring due to the wiring surface's possessing minute undulations. Grains are generated on the wiring alone, but are not limited by the generation, with the highest possible frequency, of a treatment with dispersion scattering amounts based on detection signals obtained from identical chip locations as described in Japanese Patent Application Laid-Open No. 2000-105203.

Although this problem is alleviated by enlarging the neighboring regions as per the above-described conventional technology, the problem exists that regions with different attributes then lie within neighboring regions. That is, in this grain example, even though there is a requirement to calculate the scattering of the original wiring pattern, the enlargement of the neighboring region results in the calculation of scattering that includes regions other than the wiring parts, which means that the scattering of the wiring pattern cannot be calculated. Hence, with the conventional technology, the higher the sensitivity of the inspection or defect observation method, the more locations that do not constitute defects are detected, and this technology has therefore been confronted by the problem that the detection and observation of the defects originally intended is problematic.

Furthermore, because the detection of defects is performed in one step, due to memory restrictions there is no other recourse but to assume that the calculation of scattering is performed using a Gaussian distribution and the like, and it has therefore not been possible to determine a complex scatter. Furthermore, because scattering using a Gaussian distribution is first found after an inspection of the entire wafer has been performed, it has not been possible to determine this scattering in the course of actually performing an inspection, and hence the threshold value could only be determined from the scattering at a point that lies several chips before the location ultimately inspected.

SUMMARY OF THE INVENTION

The present invention provides a defect detection or observation method that detects fine defects in the course of defect inspection and observation, avoids false detection of defects, and does not classify as a defect candidate a grain phenomenon or another phenomenon that does not affect a product.

In accordance with an aspect of the present invention, a method for inspecting defects of a product having a plurality of product units formed repetitively at different locations comprises obtaining an image of the product units on the product having an appearance to be observed; detecting regions of the image each having an appearance which differs from an expected appearance by greater than a preset threshold; calculating feature amounts for the detected regions; classifying the detected regions into groups of defect candidates, each group including defect candidates having similar or identical appearances, or defect candidates which are disposed at corresponding identical locations or adjacent locations on the different product units and have similar or identical appearances; forming an aggregate of the feature amounts of the detected regions in the different product units, for each of the groups of defect candidates; and determining for each product unit attributes for the detected regions by comparing the feature amounts of the detected regions belonging to each group of defect candidates with a distribution of the aggregate of the feature amounts for the group of defect candidates. The attributes include a broad classification of the detected regions based on whether the detected regions belonging to each group are genuine defects.

In accordance with another aspect of the invention, a method for inspecting defects of a sample having a plurality of sample regions repetitively formed at different locations comprises capturing an image of the sample; extracting defect candidates from the captured image; dividing the extracted defect candidates into groups; and identifying, for each of the divided groups, genuine defects from the defect candidates by using criteria corresponding to the groups.

In accordance with another aspect of this invention, a method for inspecting defects comprises capturing an image of a sample; generating a differential image by comparing the captured image with a pre-stored reference image; extracting a plurality of defect candidates from the generated differential image by using a first threshold value; grouping adjacent defect candidates among the plurality of defect candidates extracted into separate groups; and identifying genuine defects from among the defect candidates of each of the groups.

In accordance with another aspect of this invention, a method for inspecting defects comprises capturing an image of a sample; detecting defect candidates by comparing the captured image with a pre-stored reference image; extracting feature amounts for the detected defect candidates; storing images of the detected defect candidates and the feature amounts of the defect candidates; and identifying genuine defects from the defect candidates by using the stored defect-candidate images and feature amounts of the defect candidates.

In accordance with another aspect of this invention, a method for inspecting defects comprises detecting defect candidates while sequentially inspecting patterns in chips formed repetitively on a sample, with respect to a plurality of chips formed on the sample; grouping defect candidates into groups of defect candidates, each group including defect candidates which are disposed at corresponding identical locations or adjacent locations on the different chips when overlapped with each other; setting a threshold value for defect extraction in accordance with feature amounts for the defect candidates for each of the groups; and extracting genuine defects from among the defect candidates for each of the groups by using the threshold value.

In accordance with another aspect of the present invention, a graphical user interface (GUI) for inspecting defects comprises items on a display representing defect candidates which are classified into defects and false alarm defect candidates of a product using one or more parameters; and a user input device to permit a user to modify the one or more parameters used to classify the defects and false alarm defect candidates from the defect candidates so as to reclassify the defect candidates. The input device may be a mouse, a trackball, or the like.

These and other objects, features and advantages of the invention will be apparent from the following more particular description of preferred embodiments of the invention, as illustrated in the accompanying drawings.

BRIEF DESCRIPTION OF THE DRAWINGS

FIG. 1 is a block diagram showing the basic constitution of the defect inspection device according to an embodiment of the present invention;

FIG. 2 is a block diagram showing a modified example of the constitution of the defect inspection device according to an embodiment of the present invention;

FIG. 5(a) shows an example of the golden pattern used in specific embodiments of the present invention; FIG. 5(b) shows the frequency distribution with respect to reference brightness; and FIG. 5(c) shows a feature space frequency distribution for a detected defect candidate;

FIG. 6 is a sequence diagram for the defect inspection method according to an embodiment of the present invention;

DESCRIPTION OF THE PREFERRED EMBODIMENTS

Figure 3:
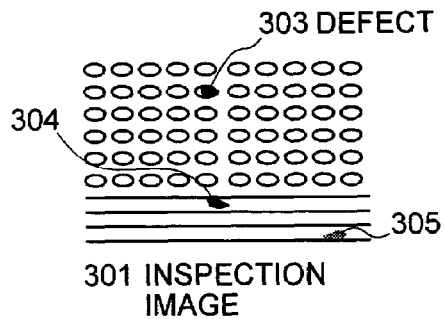
FIGS. 3(a) to 3(c) serve to illustrate the generation of false defects, and FIG. 3(d) serves to illustrate the grouping of false defects according to an embodiment of the present invention.
Figure 3:
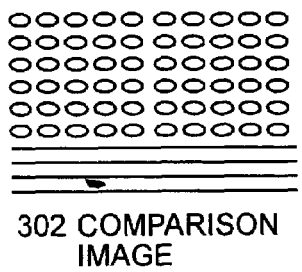
Figure 3:
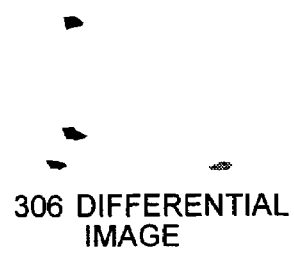
Figure 3:
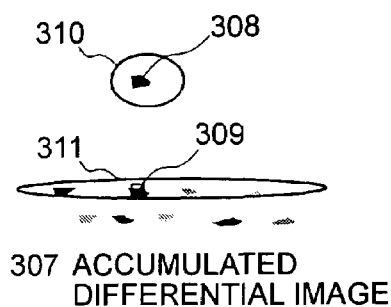

FIG. 1 is an overall constitutional view of the semiconductor defect analysis device that constitutes the first embodiment of the present invention. The reference character 101 refers to a semiconductor wafer which is the inspection object. A plurality of chips with the same design are formed on the semiconductor wafer. The reference character 102 represents an illumination device which illuminates the inspection object 101. Image pickup device 103 is provided for detecting reflected light that is reflected by the inspection object, via an objective lens 100.

The light signal thus detected is converted by image pickup device 103 into an electrical signal, and is converted into a digital signal by an AD converter (not shown) before being inputted to image processing apparatus 104. The reference character 105 refers to a positional shifting device. The positional shifting device shifts the phase by means of a FIFO circuit and the like that is provided therein and exercises control such that the output signal of the positional shifting device 105 and the output signal of the image pickup device 103 are signals for different locations formed having the same original appearance.

The reference character 106 refers to a brightness correction device which corrects the brightness of the output signal of the image pickup device 103 and the output signal of the positional shifting device 105 by means of the method described in Japanese Patent Application Laid-Open No. 2001-77165, for example. The reference character 109 refers to a comparing device which calculates the difference between the output signal of the image pickup device 103 and the output signal of the brightness correction device 106. Locations in which this difference is large can be regarded as defect candidates.

The reference character 110 refers to a defect candidate extractor which performs binary processing with respect to the output signal of the comparing device 109. Two types of binary threshold values are established, the first binary threshold value being used to extract defect candidates. In other words, assuming that the output signal of the comparing device 109 is S, the absolute value thereof is ABS(S); and assuming that the first threshold value is Th1, in cases where the absolute value is equal to or less than this threshold value, the signal is extracted as a defect candidate.

$$ABS(S) > Th1 \quad \text{(First equation)}$$

The second threshold value Th2 is set lower than the first so that the extraction region is larger. In addition, locations for which the output signal S of the comparing device 109 is larger than Th2 are subjected to leveling processing. Of the leveled regions, locations for which the S absolute value ABS(S) exceeds Th1 are called defect candidates, the other locations being called large differential image regions.

The feature amounts for the regions which are judged to be defect candidates or large differential image regions are extracted by the defect candidate extractor 110. Here, the feature amounts extracted by the defect candidate extractor 110 are as follows: (1) Inspection signal average value, (2) inspection signal scattering, (3) reference signal average value, (4) reference signal scattering, (5) brightness differential average value, (6) brightness differential scatter, (7) detected coordinate position, and (8) defect elliptical approximation size. Here, the inspection signal corresponds to the output signal of the image pickup device 103, the reference signal corresponds to the output signal of the positional shift device 105, and the brightness differential corresponds to the output signal of the comparing device 109.

The reference character 107 refers to an image accumulation controller which possesses the following functions.
(a) The storage of feature amounts for the defect candidates and for the large differential image regions detected by the defect candidate extractor 110 in an image information storage memory 108.
(b) The storage of an image of the vicinity of a defect candidate detected by the defect candidate extractor 110 in the image information storage memory 108.
(c) The storage of an image of the vicinity of a defect candidate detected by the defect candidate extractor 110 and of images of regions having the same original appearance, in the image information storage memory 108 in a set quantity and position.

The reference character 111 refers to a defect candidate classifier which determines classes for defect candidates on the basis of the images and feature amounts stored in the image information storage memory 108, that is, whether or not the defect candidates are genuine defects. Further, depending on requirements, more detailed classification is performed for those defect candidates which are judged to be genuine defects. The results of the defect evaluation and classification are provided to an output unit 120.

The reference character 112 refers to an XY stage, and a semiconductor wafer which is the inspection object is secured on top of XY stage 112. The image processing apparatus 104 and the XY stage 112 are controlled by sequence control device 113.

Next, a description will be provided, using FIG. 3, of the method whereby the defect candidate classifier 111 classifies the defect candidates. The reference character 301 in FIG. 3(*a*) refers to an inspection image and 302 in FIG. 3(*b*) is a comparison image. The inspection image 301 and the comparison image 302 are images which are picked up in the wiring step and grains can be observed on the wiring. While 303 is a defect, 304 and 305 are grains.

FIG. 3(*c*) shows a brightness differential image 306 which is outputted by the comparator 109. Defects and grains are actualized in the brightness differential image 306. However, it is difficult to distinguish the defects from grains based on the single image shown in 306. This is because although there is a grain of low brightness in the brightness differential image as indicated by 305 of FIG. 3(*a*), there is also a grain with a higher brightness differential than the defects as denoted by 304.

FIG. 3(*d*) shows a stored differential image 307 in which large differential image regions and defect candidates which are detected for the same chip coordinates are displayed overlapping one another. Because locations in which grains are readily generated are set, in patterns that are formed having the same appearance, grains are readily generated in corresponding locations of the patterns. Hence, in the stored differential image 307, in the vicinity of grain defect candidates of one chip, grain defect candidates or large differential image regions of another chip can be seen. Therefore, groups are created according to adjacent defect candidates and large differential image regions in the stored differential image 307.

In FIG. 3(*d*), because there are no other defect candidates in the vicinity of the defect candidate 308, when a group is established to contain the defect candidate 308, 308 is the only defect candidate contained, as denoted by 310. On the other hand, in the case of a group containing defect candidate 309, a defect candidate that lies in the vicinity of the defect candidate 309 is also contained, as denoted by 311. Defect candidates which are not originally defects that are generated as a result of grains and thin film interference are typically generated in the form of an area or a line.

In order to increase the sensitivity with respect to defects in the vicinity of the wiring, groups are desirably created in the form of lines. Line-shaped groups in which noteworthy defect candidates belong and in which the largest number of defect candidates or large differential image regions belong are generated. The possibility of a defect candidate being generated is determined on the basis of the defect candidates and large differential image regions in the groups. In other words, if defect candidates and large differential image regions exist in large numbers in the groups and are similar in terms of the corresponding feature amounts, such as the brightness differential of the defect candidates evaluated for example, it is considered that the defect candidates evaluated are not defects.

Japanese Patent Application Laid-Open No. 2000-105203 discloses a method involving treatment with dispersion scattering amounts based on detection signals obtained from identical chip locations. However, there are frequent cases where grain defect candidates and large differential image regions, and the like, generally deviate greatly from a Gaussian distribution. In addition, because grains are generated locally, the probability is high that grains will not be generated in the same location on another chip.

Consequently, favorable accuracy cannot be ensured by simply calculating scattering in identical locations as has been the case conventionally. The present invention makes it possible, by means of the above-described grouping, to calculate the distribution of the brightness differential to also include neighboring locations which are not necessarily the same, whereby defects can be determined with greater accuracy.

The present invention can also be combined with the method disclosed by Japanese Patent Application Laid-Open No. 2000-105203, that is, a method for setting a threshold value on the basis of signal scattering which is calculated for each region in the chips formed on the semiconductor wafer.

The brightness differential in regions which are not detected as being defect candidates and large differential image regions can be approximated by means of a Gaussian distribution which is centered on zero. The calculation of scattering by means of a comparison of signals including peripheral regions which is dependent on grouping is effective in order to accurately determine scattering with a low frequency of occurrence. However, the possibility exists that regions that possess a plurality of attributes, such as regions on the wiring or beyond the wiring for example, will be allocated to the same group. Therefore, where signals which are not detected as being defect candidates and large differential image regions are concerned, scattering is therefore desirably calculated from only signals that correspond to the same chip coordinates, without grouping being performed.

Figure 4:
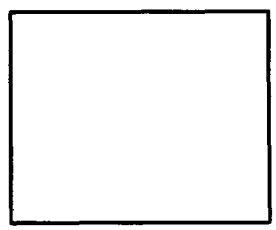
FIGS. 4(a) and 4(b) shows an example of a dispersion map and a brightness differential mock distribution.
Figure 4:
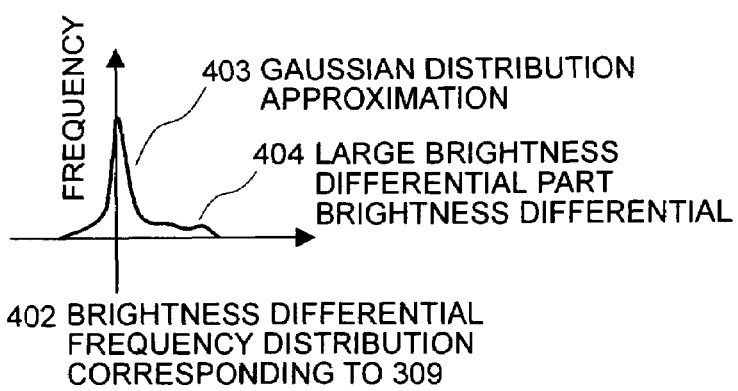

This is because in cases where an approximation using the limitations of a Gaussian distribution is feasible, there is not a large amount of data and data scattering that can be found accurately. A conceptual view in which the standard deviation of the distribution is mapped is shown in the dispersion map 401 of FIG. 4(a). The reference character 402 of FIG. 4(b) represents the brightness differential frequency distribution corresponding to the defect candidate 309. The brightness differential of the defect candidate 309 is evaluated on the basis of the frequency distribution of 402, whereby a determination of whether or not this defect candidate is a genuine defect can be made.

The grouping problem relative to defect candidates arises where defect candidates or large differential image regions of a plurality of attributes are mixed in a single group. This mixing can be effectively prevented by combining feature amounts that exclude positional information. A method that involves using the brightness values of a reference image has been suggested as one such method. The brightness of locations which have different attributes generally differs. Therefore, a method can be employed whereby regions of different brightness are not mixed in the same group even if defect candidates or large differential image regions lie in the vicinity of such regions.

Care must therefore be directed toward inconsistencies in brightness generated so as to differ in different chips. On the basis of the brightness of the reference image upon detection of defect candidates and/or large differential image regions, a large influence is exerted by inconsistencies in the brightness of the reference image and it is difficult to stably separate locations with different attributes. Hence a golden pattern or ideal pattern such as 501 in FIG. 5(a) is calculated and separation is carried out based on the corresponding brightness. The golden pattern is produced by converting the average values or median values of the brightness for the same chip coordinates into an image. Usage of this golden pattern means that defect candidates or large differential image regions are separated without being affected by brightness inconsistencies from chip to chip.

This is shown schematically by the frequency distribution 502 with respect to reference brightness in FIG. 5(b). Similarly to the bright differential frequency distribution 402, the frequency distribution is constituted by a Gaussian distribution 503, and by a distribution 504 other than a Gaussian distribution for large differential image regions and defect candidates. Because the Gaussian distribution regions 503 match a distribution that corresponds to the pixels of the defect candidates which are evaluated, a distribution for the brightness of these pixels is shown. The reference character 504 represents the distribution of defect candidates and large differential image regions which lie in the vicinity of these pixels. The distribution 504 differs from the distribution 503 and is therefore not judged as being the same group.

The feature space frequency distribution 505 of FIG. 5(c) represents a method for specifying groups according to a multi-dimensional feature space using other feature amounts. For example, Japanese Patent Application Laid-Open No. 2001-77165 describes the use of image texture and edge information for space segmentation. Although a multidimensional feature space can also be formed using such feature amounts, the problem then occurs that, generally, where texture and edge information are concerned, feature amounts are calculated on the basis of a plurality of pixels, which means that the spatial resolving power is then poor.

Therefore, as an effective measure, a feature amount which is based on pixels that correspond to pixels obtained by picking up, parts on the sample which have the same original appearance, such as the scattering of a differential image, for example, may be used. Originally, a multi-dimensional feature amount space was used for the purpose of preventing locations of large and small scatter from being mixed in the same group. However, because the groups are established by using this feature amount, locations that possess at least different scattering are no longer established as the same group. After the groups have been established, it is determined whether or not defect candidates are actual defects based on scattering which is calculated from information on the defect candidates and large differential image regions belonging to these groups.

Further, the usage of design information has been suggested as another possible feature. For example, supposing that the object pattern is a semiconductor memory, the memory cell parts have a very narrow wiring pitch in comparison with the border pattern, and the respective grain generation condition and behavior of thin film interference, and the like, differ greatly. Results similar to those for the method described above can also be produced by establishing groups on the basis of design data exerting a large influence, after detecting defects such as the fineness of the wiring pitch.

In order to perform grouping as described above, grouping can be performed using the following four criteria: 1) the criterion that large differential image regions and defect candidates detected for the same chip coordinates and which are adjacent as a result of overlap therebetween should be grouped; 2) similarity between feature amounts calculated based on inspection signals or reference signals; 3) scattering of the inspection signals or brightness differential signals for the same chip coordinates; and 4) design information. More simply, grouping may be performed using any one of these criteria or a combination of any of these criteria.

This sequence is shown in FIG. 6. Grouping is performed after an image of the entire wafer has been detected and all the defect candidates and large differential image regions have been detected, and the defect candidates are evaluated once again by means of the method described above in order to identify whether or not these defect candidates are defects.

The present invention has been described using the constitution shown in FIG. 1, but similar functions can also be implemented by using the constitution shown in FIG. 2. Unlike the constitution of FIG. 1, where the constitution of FIG. 2 is concerned, the images of the defect candidates and the large differential image regions are not stored, only the feature amounts being stored. Instead of the image information accumulation controller 107 and image information storage memory 108 of FIG. 1, the embodiment in FIG. 2 includes a feature amount storage controller 201 which controls the storage of feature amount information, a feature amount extractor 202 which detects the feature amount information, and a feature amount storage memory 202 which stores the feature amount information. Because, as per the constitution of FIG. 2, the images of the defect candidates are not stored, the constitution can be achieved by means of a comparatively small memory.

Here, the generation of the golden pattern 501 and the dispersion map 401 is assumed as a precondition. The brightness of the golden pattern pixels of the defect candidate regions and the values of the dispersion map can be found. Here, according to the constitution of FIG. 2, because data for the differential image values is not obtained, the differential image values of the pixels of the defect candidate regions cannot be binarized again on the basis of scattering. However, by making the assumption that the defect candidate regions possess the same differential image average values and dispersion in any position, it is possible to determine the presence or absence of pixels that exceed the threshold value in the defect candidate regions.

Methods for identifying defects which have been used hitherto have been based on the premise that there are basically no major fluctuations in the inspection signals and in the reference signals used in the extraction of defect candidates. However, in the most recent defect inspection that employs a short-wavelength illumination light source such as DUV light, the inspection signals and reference signals are both affected by thin film interference and there is therefore the possibility of there being a large deviation from the golden pattern. In cases where the inspection signals and reference signals are conversely shifted toward the golden pattern, the brightness differential is very large and hence it becomes difficult to identify the defective parts and satisfactory parts even by using the technique described above.

Therefore, in order to deal with such a case, this problem can be resolved by setting different reference signals and re-calculating the brightness differential. One straightforward setting method involves a comparison relative to the golden pattern. Because the golden pattern is an average of a plurality of locations, the S/N is high, and the phenomenon in which the extremities of the pattern are light or dark is not produced. In addition, in order to diminish the effects of thin film interference, the creation of the reference signals using a larger number of images is employed. This method will now be described using FIG. 7.

Figure 7:
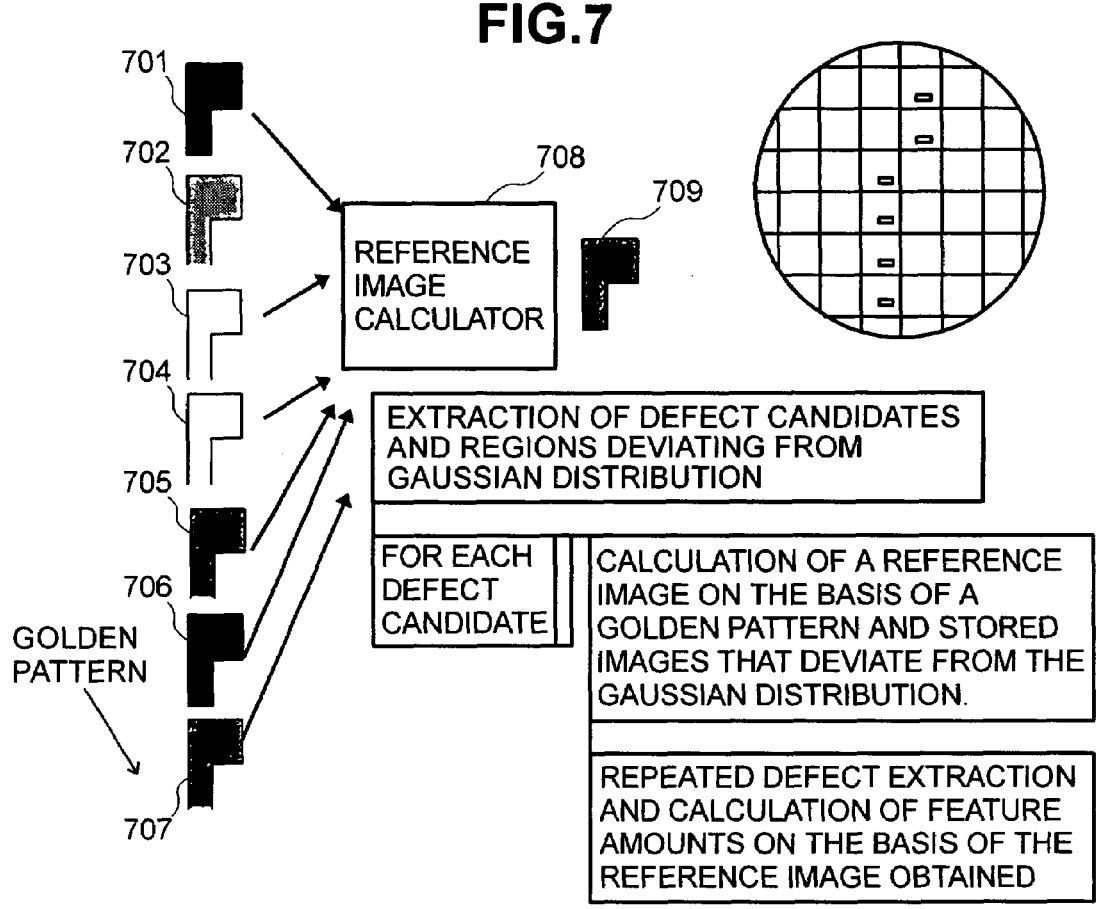
FIG. 7 serves to illustrate the image comparison method according to an embodiment of the present invention.

In FIG. 7, suppose that a comparison is made with 701 as the reference signal and that the inspection object pattern 702 is detected as a defect candidate. Here, image information accumulation controller 107 in FIG. 1 stores patterns with the same chip coordinates as 702 in the image information storage memory 108. The capture of a fixed number of patterns is completed and a reference image is calculated so as to be as close as possible to 702. For example, the minimum squaring method and the like may be used as this method. For example, when the images 701, 703, and 707 are I1, I2 and I6 expressed in vector form, the reference pattern 709 thus generated is the linear sum $G1I1 + G2I2 + \ldots + G6I6$, and, in cases where the pattern 702 is ID, 709 may be generated by calculating G1, G2, ... G6 so as to minimize $(ID-(G1I1 +G2I2 + \ldots +G6I6))^2$.

Further, as a more straightforward method, a method of establishing, as the reference image, the pattern which is the closest to 702 of the patterns 701, 703 to 707 may be adopted.

Figure 8:
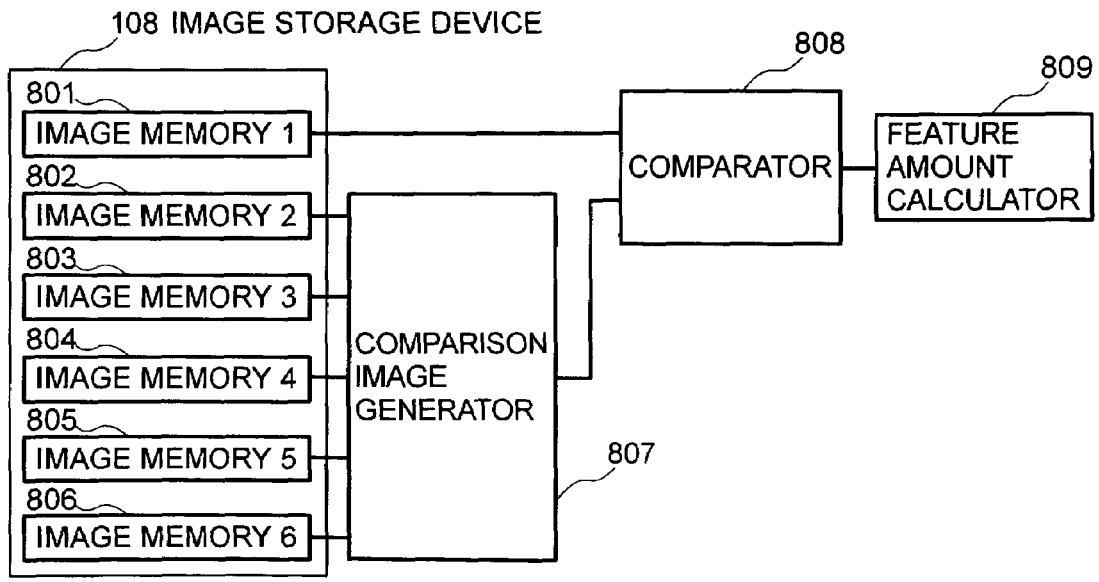
FIG. 8 serves to illustrate the image comparison method according to an embodiment of the present invention.

In cases where the brightness differential between the newly generated reference image and inspection image is calculated and this brightness differential is equal to or less than the threshold value, this differential is removed from the defect candidates or large differential image regions. The constitution is shown in FIG. 8.

Figure 9:
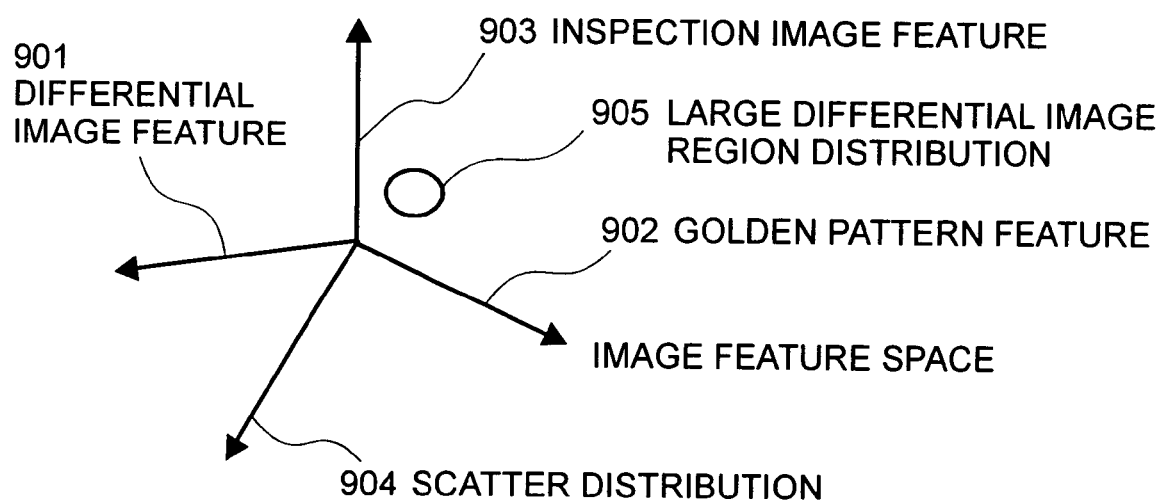
FIG. 9 is an explanatory view of a feature space that is used when performing subclassification of genuine defects detected according to an embodiment of the present invention.

The description has hitherto related to a method for eliminating the contamination of defects by grain and thin film interference phenomena which are thought to be defects. However, the objective behind the inspection of manufactured products is generally that of specifying the cause of product defects, and hence the extraction of genuine defects alone is unsatisfactory and there is the possibility that defect candidates that are not defects will also come to contaminate defect candidates which are judged as being genuine defects. Therefore, the defect candidates which are classified as defects are subject to classification using more complex feature amounts. This is illustrated by FIG. 9.

The image feature space is broadly divided such that defects are classified on the basis of features which are, namely, a differential image feature 901, a golden pattern feature 902, an inspection image feature 903, and a scatter distribution 904. These feature amounts are calculated from the defect regions and represented as feature vectors. As far as the class boundaries for defects to be classified are concerned, separation is performed on the basis of instructions issued by the user beforehand or boundaries already registered in the system. The large differential image region distribution 905 represents a non-defect region.

In order to determine defect class boundaries, boundaries will typically be set automatically by the system as a result of the user's issuing instructions for the attributes of defect images that have already been picked up. However, here, the user may issue instructions specifying, from among the locations which are detected by the defect candidate extractor 110 of FIG. 1 as defect candidates, only the defect candidates which are determined by the defect candidate classifier 111 as being defects. Further, rather than issuing instructions within the feature space such that the defect candidates which are determined by the defect candidate classifier 111 as non-defects are automatically sampled as non-defects, performance can be improved more effectively by making it possible to undermine, by means of this classification, the determination of defect candidates which are judged by the defect candidate classifier 111 to be defects.

Figure 10:
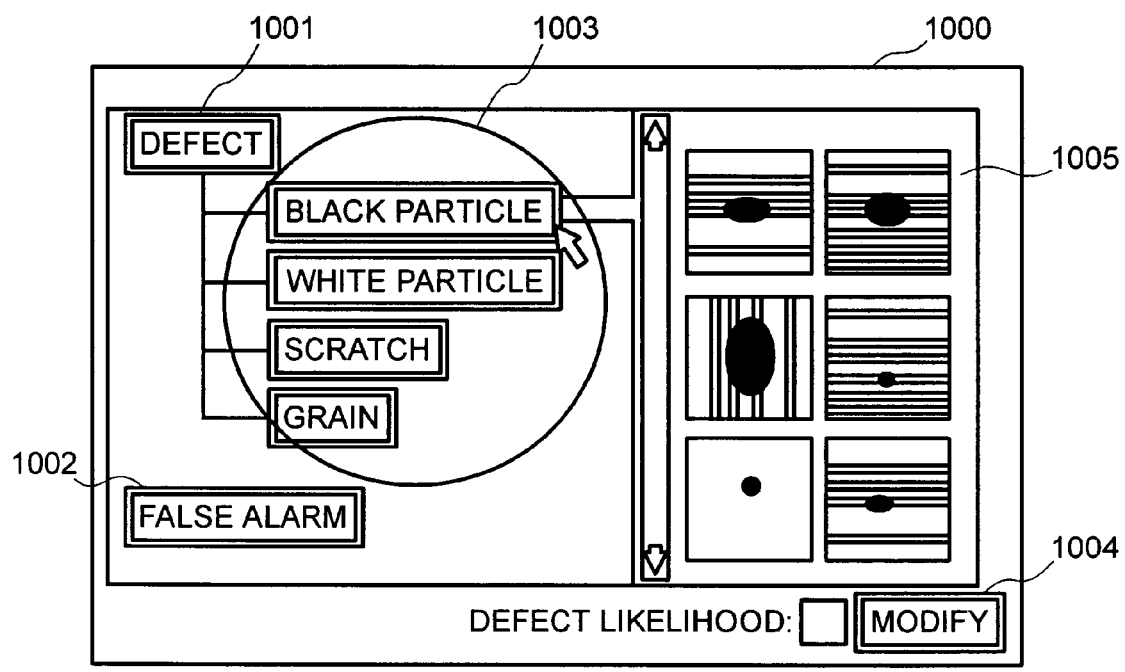
FIG. 10 is a simplified view of a screen display illustrating a user interface for displaying defect candidates including defects and non-defects according to an embodiment of the invention.

FIG. 10 shows an example of a screen display 1000 illustrating a user interface for displaying defect candidates including defects and non-defects according to an embodiment of the invention. The box 1001 is labeled defect, and represents a class of defect candidates which are evaluated as defects, for instance, using the method as described above in connection with FIGS. 4 and 5. The other class of defect candidates are "false alarm" cases which have been evaluated as being normal or non-defects using the method of FIGS. 4 and 5. The defects under box 1001 are further classified into subclasses of defects such as black particle, white particle, scratch, and grain in defect subclass boxes 1003. This may be done using the method as shown in FIG. 9. Pictures of the defect candidates are shown in the display area 1005 which an operator can browse and view in more detail by clicking on the pictures. Box 1004 shows a "modify" function which the operator can click using an input device such as a mouse or the like to change the parameters or criteria that are used to control the evaluation of the defect candidates, such as the threshold value and the feature amounts as discussed above. For example, the evaluation of the inspection signal average value, brightness differential average value, the defect elliptical approximation size, or the like may be adjusted so that the defect candidates will be classified differently as being defects or "false alarm" defect candidates. This may be necessary, for example, if a significant amount of "false alarm" cases are classified as defects or vice versa during the previous defect evaluation. After the operator changes one or more of the parameters, the defect candidates are re-evaluated and the results are displayed to show the shift in the evaluation. In this way, the operator can examine the results of the defect determination, modify the parameters and re-evaluate the defect candidates interactively until the operator is satisfied with the results of the defect evaluation.

As described hereinabove, the present invention detects defect candidates and performs a broad classification according to whether these defect candidates are defects or not and then implements subclassification once again. This is true for the reasons provided below.

First of all, one reason for such processing is to be able to eliminate the labor which user instruction entails. In cases where a multiplicity of images that are not defects are detected, it takes a very long time for the user to judge this fact and to issue instructions to that effect, and this is presented as a reason for the delay of the shipping of products in a multiple product type process. A large number of feature amounts is generally required for subclassification. However, if a large number of feature amounts are present, a great many instruction samples are required in order to perform classification of the feature space accurately. This fact also means that it is difficult to issue instructions for all product types. Also, if instructions are issued in a state in which even a judgment of whether a defect candidate is a defect or not a defect is difficult, the system operating efficiency inevitably drops.

By using this method, defect candidates can be classified into defects and non-defects without instruction even when subclassification is practiced and it is possible to provide the user with a convenient system even in a multiple product type process. Further, because false defects can be removed prior to subclassification, classification can be simplified and the efficiency with which a correct classification is made can be improved.

Furthermore, the present invention was described above in terms of a case which involved the inspection of a semiconductor device. However, the present invention is not limited to such a case, and can also be applied to any objective such as, for example, the inspection and evaluation of defects in a TFT panel manufacturing process, the inspection and evaluation of defects in a PDP panel manufacturing process, the inspection and evaluation of defects in a hard-disk GMR head manufacturing process, and the inspection and evaluation of defects in a print substrate.

Further, to describe this semiconductor inspection in more detail, a number of methods have been proposed for inspecting the semiconductor, such as bright field detection methods, dark field detection methods, laser multi-focus detection methods, SEM-type detection methods, AFM-type detection methods, and SIM-type detection methods, the present invention being applicable to all such methods.

The application of the above-described defect inspection and evaluation method makes it possible, in an inspection and evaluation that is directed toward a detailed semiconductor pattern and other samples, to correctly classify genuine defects and false defects and to then classify genuine defects in more detail.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for inspecting a sample having a plurality of chips having essentially the same pattern, comprising:
    capturing an image of the sample;
    extracting defect candidates from the captured image by comparing the captured image with a pre-stored reference image and producing a differential image from the captured image and the reference image;
    classifying the extracted defect candidates into groups; and
    identifying, for each of the classified groups, genuine defects from the defect candidates by using criteria corresponding to the groups;
    wherein in the step of classifying, each group including defect candidate which are disposed at corresponding identical locations or adjacent locations on a plurality of sample regions which are disposed at corresponding identical locations or adjacent locations on different product units when overlapping said differential image with differential images of the different sample regions.

2. The method for inspecting a sample according to claim 1, wherein classifying the extracted defect candidates into groups comprises capturing the sample images and extracting the defect candidates of the plurality of sample regions on the sample, by using data constituting an aggregate of results of observing the defects candidates in the plurality of chips on the sample.

3. The method for inspecting a sample according to claim 1, wherein identifying genuine defects from the defect candidates comprises determining the criteria corresponding to the groups by using information on feature amounts of the defect candidates belonging to the separate groups.

4. The method for inspecting a sample according to claim 3, wherein identifying genuine defects from the defect candidates comprises:
    forming an aggregate of the feature amounts of the defect candidates in the plurality of sample regions in the sample, for each of the groups of defect candidates; and
    comparing the feature amounts of the defect candidates belonging to each group with a distribution of the aggregate of the feature amounts for the group of defect candidates.

5. The method for inspecting a sample according to claim 3, wherein the feature amounts of each defect candidate comprise at least one of: inspection signal average value, inspection signal scattering data, reference signal average value, reference signal scattering data, brightness differential average value, brightness differential scatter data, detected coordinates position, and defect elliptical approximation size.

6. The method for inspecting a sample according to claim 1, further comprising classifying the genuine defects into different types of genuine defects.

7. The method for inspecting a sample according to claim 6, further comprising displaying the genuine defects and defect candidates.

8. The method for inspecting a sample according to claim 1, further comprising revising the criteria used to identify genuine defects from the defect candidates; and then identifying, for each of the divided groups, genuine defects from the defect candidates by using the revised criteria.

9. The method of inspecting a sample according to claim 8, further comprising displaying results of the identifying.

10. A method for inspecting a sample, comprising:
- capturing an image of a sample, wherein the specimen comprises a plurality of chips formed thereon, each chip having essentially the same pattern;
- generating a differential image by comparing the captured image with a pre-stored reference image;
- overlapping plural differential images generated by repeating the steps of capturing and generating, and forming an overlapped differential image;
- extracting a plurality of defect candidates from the generated overlapped differential image by using a first threshold value;
- grouping adjacent defect candidates among the plurality of defect candidates appearing in the overlapped differential image formed at the step of overlapping; and
- identifying genuine defects from among the defect candidates of each of the groups,
- wherein in the step of grouping, each group including defect candidates which are disposed at corresponding identical locations or adjacent locations on the overlapped differential image.

11. The method for inspecting a sample according to claim 10, wherein grouping adjacent defect candidates comprises grouping defect candidates that are adjacent to defect candidates having identical or similar feature amounts among the extracted plurality of defect candidates.

12. The method for inspecting a sample according to claim 10, wherein identifying genuine defects comprises determining criteria corresponding to the groups by using information on feature amounts of the defect candidates belonging to the separate groups.

13. The method for inspecting a sample according to claim 12, wherein the feature amounts of each defect candidate comprise at least one of: inspection signal average value, inspection signal scattering data, reference signal average value, reference signal scattering data, brightness differential average value, brightness differential scatter data, detected coordinates position, and defect elliptical approximation size.

14. An apparatus for inspecting a sample, comprising:
- an image capturing unit which captures an image of a sample, wherein the specimen comprises a plurality of chips formed thereon, each chip having essentially the same pattern;
- a defect candidate extracting unit which extracts defect candidates from the image captured by the image capturing unit by comparing the captured image with a pre-stored reference image and producing a differential image from the captured image and the reference image;
- a classifying unit which classifies the defect candidates extracted by the defect candidate extracting unit into groups; and
- a genuine defect identifying unit which identifies, for each of the groups classified by the classifying unit, genuine defects from the defect candidates by using criteria corresponding to the groups,
- wherein the classifying unit classifies the defect candidates into groups for each group includes defect candidates which are disposed at corresponding identical locations or adjacent locations on the different chips when overlapping said differential image with differential images of the different chips.

15. The apparatus for inspecting a sample according to claim 14, wherein the genuine defect identifying unit identifies genuine defects from the defect candidates by determining the criteria corresponding to the groups by using information on feature amounts of the defect candidates belonging to the separate groups.

16. The apparatus for inspecting a sample according to claim 14, wherein the genuine defect identifying unit further classifies the genuine defects into different types of genuine defects.

17. The apparatus for inspecting a sample according to claim 14, further comprising a display unit for displaying the genuine defects identified by the genuine defect identifying unit and defect candidates defect candidate extracted by the extracting unit.

18. An apparatus for inspecting a sample, comprising:
- an image capturing unit which captures an image of a sample, wherein the specimen comprises a plurality of chips formed thereon, each chip having essentially the same pattern;
- a differential image generating unit which generates a differential image by comparing the captured image with a pre-stored reference image;
- differential image overlapping unit which overlaps plural differential images generated by the differential image generating unit and generates an overlapped differential image;
- a defect candidate extracting unit which extracts a plurality of defect candidates from the overlapped differential image generated by the differential image overlapping unit by using a first threshold value;
- a grouping unit which groups adjacent defect candidates among the plurality of defect candidates extracted from the overlapped differential image by the defect candidate extracting unit; and
- a genuine defect identifying unit which identifies genuine defects from among the defect candidates of each of the groups grouped by the grouping unit;
- wherein the grouping unit groups the defect candidates into groups for each group includes defect candidates which are disposed at corresponding identical locations or adjacent locations on the overlapped differential image.

19. The apparatus for inspecting a sample according to claim 18, wherein the grouping unit groups the defect candidates into groups that are adjacent to defect candidates having identical or similar feature amounts among the extracted plurality of defect candidates.

20. The apparatus for inspecting a sample according to claim 18, wherein genuine defect identifying unit identifies genuine defects by determining criteria corresponding to the groups by using information on feature amounts of the defect candidates belonging to the separate groups.

* * * * *